(12) United States Patent
Thele et al.

(10) Patent No.: US 12,723,623 B2
(45) Date of Patent: Sep. 1, 2026

(54) BEARING POSITIONING STRUCTURE WITHOUT RADIAL INTERFERENCE FIT

(71) Applicant: TK ELEVATOR INNOVATION AND OPERATIONS GMBH, Düsseldorf (DE)

(72) Inventors: Randolf Thele, Kneese (DE); Benno Tresp, Bützow (DE); Hanna Klostermann, Hamburg (DE); Reinhardt Krämer, Hamburg (DE); Martin Haag, Hamburg (DE)

(73) Assignee: TK ELEVATOR INNOVATION AND OPERATIONS GMBH, Düsseldorf (DE)

( * ) Notice: Subject to any disclaimer, the term of this patent is extended or adjusted under 35 U.S.C. 154(b) by 80 days.

(21) Appl. No.: 18/847,425

(22) PCT Filed: Mar. 16, 2023

(86) PCT No.: PCT/EP2023/056801

§ 371 (c)(1),
(2) Date: Sep. 16, 2024

(87) PCT Pub. No.: WO2023/175102

PCT Pub. Date: Sep. 21, 2023

(65) Prior Publication Data

US 2025/0207631 A1 Jun. 26, 2025

(30) Foreign Application Priority Data

Mar. 17, 2022 (CN) ......................... 202210264594.1

(51) Int. Cl.

| | |
|---|---|
| ***F16C 23/06*** | (2006.01) |
| ***B66B 23/00*** | (2006.01) |
| ***B66B 23/12*** | (2006.01) |

(52) U.S. Cl.
CPC .......... *F16C 23/06* (2013.01); *F16C 2326/58* (2013.01)

(58) Field of Classification Search
None
See application file for complete search history.

(56) References Cited

U.S. PATENT DOCUMENTS

| | | | | |
|---|---|---|---|---|
| 6,405,848 | B1 | 6/2002 | Babler | |
| 8,469,176 | B2 * | 6/2013 | Matheisl | B66B 23/12 198/321 |
| 9,802,791 | B2 * | 10/2017 | Ludwig | B66B 23/12 |

FOREIGN PATENT DOCUMENTS

| | | |
|---|---|---|
| CN | 107215761 A | 9/2017 |
| WO | 2020011597 A1 | 1/2020 |

OTHER PUBLICATIONS

International Search Report and Written Opinion of Corresponding International Application No. PCT/EP2023/056801 mailed Jun. 6, 2023, 10 pages.

* cited by examiner

*Primary Examiner* — Kavel Singh
(74) *Attorney, Agent, or Firm* — Dinsmore & Shohl LLP

(57) ABSTRACT

The present disclosure discloses a bearing positioning structure without radial interference fit, which is used for a step of an escalator, including: a bearing seat, a rolling bearing through which a step roller is installed on the bearing seat; wherein the bearing positioning structure also includes a bolt, a washer and a nut, the bearing seat has a central through hole coaxial with its circumferential surface, the bolt successively passes through the washer, a bearing inner ring of the rolling bearing, the central through hole and the nut, and the inner ring of the rolling bearing is clamped between the washer and an axial limit step of the bearing seat by tightening the nut. It can overcome the problems of (Continued)

low manufacturing and assembly efficiency, reduced component life and increased production cost caused by radial interference fit of bearing.

5 Claims, 2 Drawing Sheets

BEARING POSITIONING STRUCTURE WITHOUT RADIAL INTERFERENCE FIT

CROSS REFERENCE TO RELATED APPLICATIONS

The present application is the National Phase entry of International Patent Application PCT/EP2023/056801, filed Mar. 16, 2023, which in turn claims priority benefit to Chinese Patent Application 202210264594.1, filed Mar. 17, 2022, the entire contents of both which are hereby incorporated by reference into this application.

TECHNICAL FIELD

The present disclosure relates to a bearing positioning structure, particularly to a bearing positioning structure without radial interference fit for a step of an escalator.

BACKGROUND

As shown in FIG. 1, an escalator includes many die-casting steps 1. Each die-casting step 1 has a bearing seat 3 on both sides. A step roller 2 is installed on the bearing seat 3 through a rolling bearing 4, wherein the inner ring of the rolling bearing 4 is installed on the radial outer surface of the bearing seat 3, and the outer ring of the rolling bearing 4 can be installed to the inner surface of an inner hole of the step roller 2.

FIG. 1 shows the escalator and its die-casting step 1, with the partial enlarged view showing the installation position of the step roller 2. FIG. 2 shows the bearing seat 3 for mounting the rolling bearing 4.

The traditional bearing positioning structure often adopts the interference fit in the radial direction, that is, the interference fit in the radial direction is adopted between the bearing inner ring and the bearing seat, and/or the interference fit in the radial direction is also adopted between the bearing outer ring and the step roller.

This traditional installation way has obvious defects. Firstly, the installation is laborious and the work efficiency is low, which leads to increase of production cost, because the resistance caused by interference tolerance must be overcome. Moreover, the stress caused by interference fit is easy to cause component damage or reduce the service life of components.

In addition, because of the radial interference fit with the bearing, the tolerance requirements of the fit must have strict dimensional tolerance requirements for the bearing seat 3. This will inevitably lead to the rise of production costs and the decline of production efficiency. Considering that the die-casting step 1 is manufactured by the die-casting process, in order to meet the above tolerance requirements, the radial dimension of its bearing seat 3 must be precision machined. This further increases the cost and reduces the production efficiency.

The information disclosed in the background part of the present disclosure is only intended to strengthen the understanding of the general background technology of the present disclosure, and shall not be deemed to recognize or imply in any form that the information constitutes the prior art known to those skilled in the art.

SUMMARY

The present disclosure aims to provide a bearing positioning structure without radial interference fit, which can overcome the problems of low manufacturing and assembly efficiency, reduced component life and increased production cost caused by radial interference fit of bearing.

The present disclosure provides a bearing positioning structure without radial interference fit, which is used for a step of an escalator, the bearing positioning structure including: a bearing seat formed on both sides of the step; a rolling bearing, a bearing inner ring of which is matched with a circumferential surface of the bearing seat, so that a step roller is installed on the bearing seat through the rolling bearing; wherein the bearing positioning structure also includes a bolt, a washer and a nut, the bearing seat has a central through hole coaxial with its circumferential surface, the bolt successively passes through the washer, the bearing inner ring of the rolling bearing, the central through hole and the nut, and the inner ring of the rolling bearing is axially clamped between the washer and an axial limit step of the bearing seat without radial interference fit between rolling bearing and circumferential surface by tightening the nut.

In the bearing positioning structure without radial interference fit, in some embodiments the step of the escalator is a die-casting step which is made of castable metallic materials through a die-casting process.

In the bearing positioning structure without radial interference fit, in some embodiments an axial length of the circumferential surface of the bearing seat is adapted to an axial size of the rolling bearing and a geometric size of threaded connection, so as to avoid the contact between the die-casting step and the washer that is deformed under the pretension force. The threaded connection is composed of a combination of the bolt, the washer and the nut.

In the bearing positioning structure without radial interference fit, in some embodiments there is a transition fillet between the circumferential surface of the bearing seat and the axial limit step, and the radius of the transition fillet is less than the radius of a fillet between an inner hole of the inner ring of the rolling bearing and an end face of the rolling bearing.

In the bearing positioning structure without radial interference fit, in some embodiments the circumferential surface of the bearing seat is a conical surface with small cone angle, and the conical surface gradually tilts outwardly from the transition fillet.

The bearing positioning structure without radial interference fit of the present disclosure can achieve the following beneficial technical effects:

Because the bearing positioning is realized only by axial preload rather than radial interference fit, and the axial preload is realized only by tightening the nut, rapid assembly can be easily realized, so as to improve the assembly efficiency and reduce the production cost.

Since there is no radial interference fit, there is no torque fluctuations during assembly, which helps to ensure consistency and reliability of roller assembly. Since the appropriate tightening torque can be determined, it can ensure that the rolling bearing will not slide and will not damage the bearing limit structure. This helps to prevent the steps of the escalator from being damaged due to assembly stress, so as to improve the safety of the escalator.

Because the bearing positioning is realized only by axial preload rather than radial interference fit, the dimensional tolerance of the bearing seat is not easy to affect the assembly accuracy, so it is conducive to the high-efficiency die-casting process to manufacture the steps of the escalator. This further improves production efficiency.

The method and apparatus of the present disclosure have other features and advantages that will be apparent from the drawings incorporated herein and subsequent detailed embodiments, or will be set forth in detail in the drawings incorporated herein and subsequent detailed embodiments, which are jointly used to explain the specific principles of the present disclosure.

Figure 1:
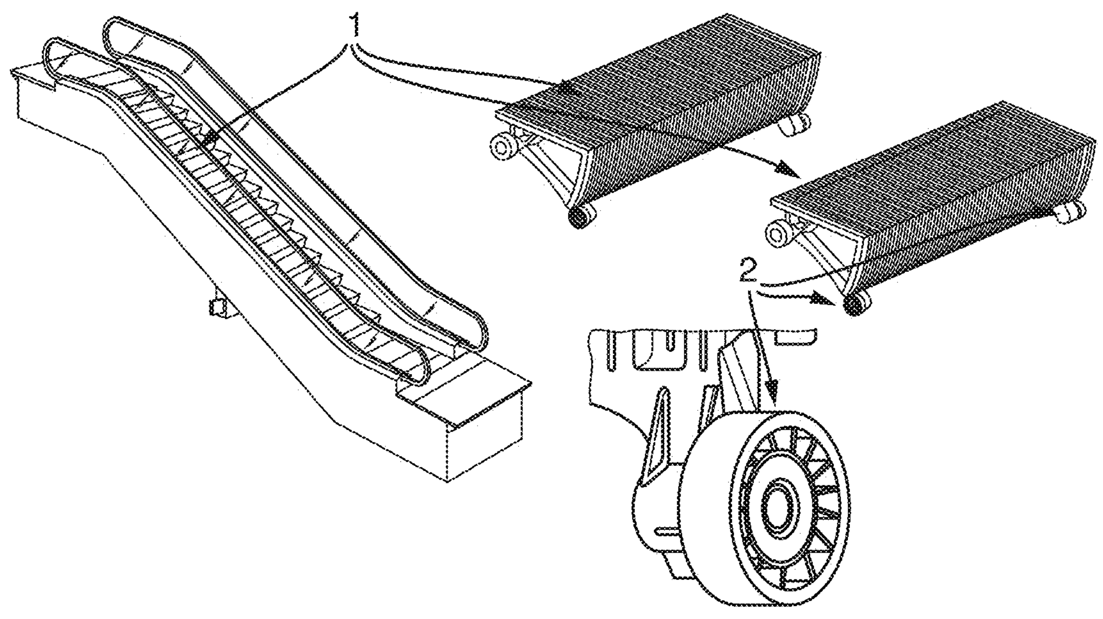
FIG. 1 shows an escalator, step structure of an escalator, and installation position of a step roller on a step.
Figure 2:
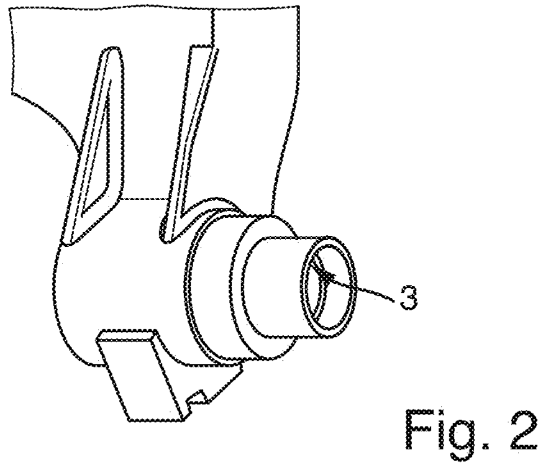
FIG. 2 shows a bearing seat of a step for installing a rolling bearing.

It should be understood that the drawings are not necessarily to be drawn to scale, but show various features of the basic principles of the present disclosure, which have been simplified to some extent. The specific design features of the present disclosure disclosed herein, including, for example, specific dimensions, orientation, positioning and shape, will be determined in part by the application and use environment for a specific purpose.

In these drawings, in a plurality of figures throughout the drawings, reference numerals refer to the same or equivalent parts of the present disclosure.

DETAILED DESCRIPTION OF EMBODIMENTS

Specific reference will now be made to various embodiments of the present disclosure, and examples of these embodiments are shown in the drawings and the following description. Although the present disclosure is described in combination with exemplary embodiments, it should be understood that this description is not intended to limit the present disclosure to those exemplary embodiments. On the contrary, the present disclosure is intended to cover not only these exemplary embodiments, but also various alternatives, modifications, equivalent forms and other embodiments that may be included within the spirit and scope of the present disclosure as defined by the appended claims.

Figure 3:
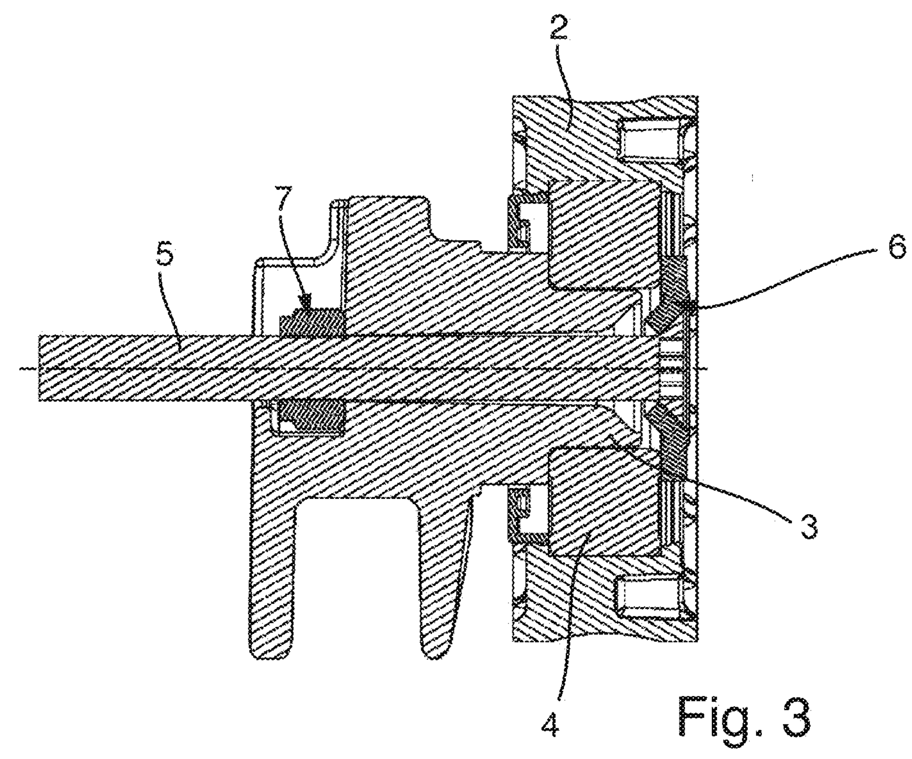
FIG. 3 shows that a rolling bearing is installed on a bearing seat through threaded connection.

FIG. 3 shows a bearing positioning structure without radial interference fit of the present disclosure.

As shown in FIG. 3, the bearing positioning structure without radial interference fit of the present disclosure is used for a step of an escalator. The step is may be a die-casting step 1, such as a die-casting step formed by die-casting of castable metallic materials, such as metal aluminum or aluminum alloy or magnesium. Aluminum or aluminum alloy is easy to die cast, which can ensure good forming accuracy with high production efficiency. Aluminum or aluminum alloy also has good strength performance and light weight, which helps to reduce weight, reduce operating energy consumption and ensure sufficient mechanical strength.

A bearing seat 3 is formed on both sides of each die-casting step 1, which is used to match with an inner ring of a rolling bearing 4. A step roller 2 is mounted on the bearing seat 3 through the rolling bearing 4.

An outer ring of rolling bearing 4 can be installed to the inner surface of an inner hole of the step roller 2, and the inner ring of the rolling bearing 4 is installed on a circumferential surface 8 of the bearing seat 3 with clearance fit. Specifically, the center of the bearing seat 3 can be provided with a through hole, a bolt 5 passes through a washer 6, then passes through the through hole of the bearing seat 3, and finally is fastened by a nut 7.

Figure 4:
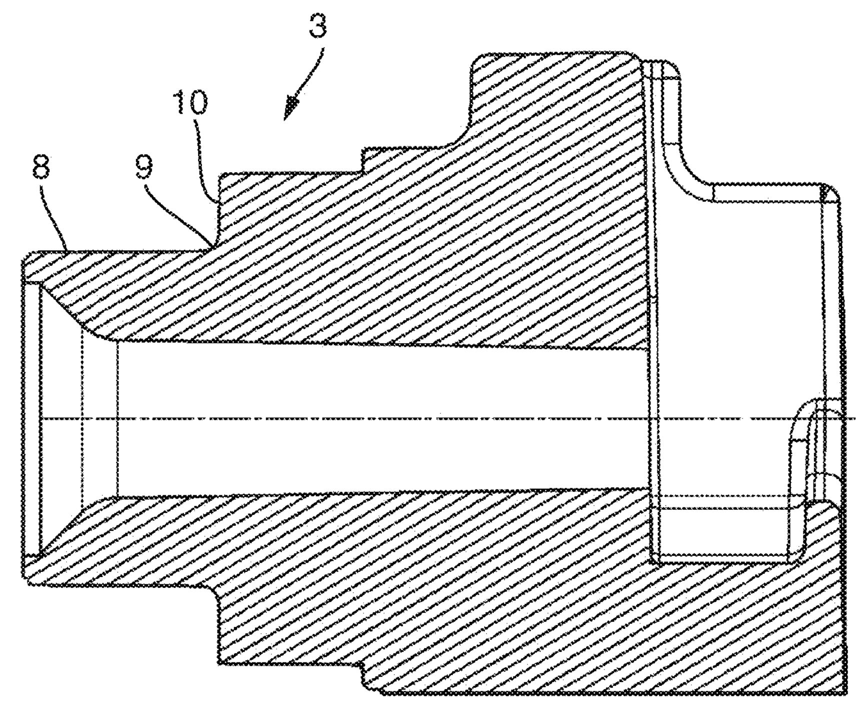
FIG. 4 shows structure of a bearing seat of the present disclosure.

FIG. 4 shows the structure of the bearing seat of the present disclosure. The bearing seat 3 has a circumferential surface 8 and an axial limit step 10. As can be seen from FIG. 3, after the nut 7 is tightened, the inner ring of the bearing 4 is clamped between the washer 6 and the axial limit step 10, thereby tightening the inner ring of the bearing 4 without radial interference fit between rolling bearing 4 and circumferential surface 8.

In the installation structure, the axial load can be realized by tightening the nut 7. In this way, the bearing positioning is realized only by axial preload rather than radial interference fit.

By determining the appropriate tightening torque, it can ensure that the rolling bearing will not slide and it will not damage the bearing limit structure.

An axial length of the circumferential surface 8 of the bearing seat 3 shall be adapted to the geometric dimensions of the bearing 4 and the threaded connection (composed of a combination of the bolt 5, the washer 6 and the nut 7) to avoid contact between the die-casting step 1 and the washer 6 that is deformed under the pretension force. That is, the length of the circumferential surface 8 cannot be too long, otherwise it is easy to cause contact between the die-casting step 1 and the washer 6 that is deformed under the pretension force, this will make the washer 6 unable to effectively compress the bearing 4.

There is a transition fillet 9 between the circumferential surface 8 of the bearing seat 3 and the axial limit step 10. The radius of the transition fillet 9 should be as small as possible so that the bearing 4 can be correctly assembled in place. Therefore, the radius of the transition fillet 9 should be at least less than the radius of a fillet between an inner hole of the inner ring of the bearing 4 and an end face of the bearing 4.

On the other hand, the radius of the transition fillet 9 cannot be too small so as to prevent stress concentration under dynamic load. Stress concentration is easy to cause fracture at the transition fillet 9.

In the bearing positioning structure without radial interference fit, the circumferential surface 8 of the bearing seat 3 can adopt a conical surface with small cone angle, and the conical surface 8 gradually tilts outwardly from the transition fillet 9. Thus, while realizing the clearance fit between the bearing 4 and the bearing seat 3, high centering accuracy is ensured. Because the step 1 adopts the die-casting process, the conical surface improves the die-casting forming conditions, improves the product quality and improves the production efficiency.

The bearing positioning structure without radial interference fit of the present disclosure has the following technical advantages:

Because the bearing positioning is realized only by axial preload rather than radial interference fit, and the axial preload can be realized only by tightening the nut, the rapid assembly can be easily realized, so as to improve the assembly efficiency and reduce the production cost.

Since there is no radial interference fit, there is no torque fluctuations during assembly, and this helps to ensure consistency and reliability of roller assembly. Since the appropriate tightening torque can be determined, it can ensure that the rolling bearing will not slide and it will not damage the bearing limit structure. This helps to prevent the steps of the escalator from being damaged due to assembly stress, so as to improve the safety of the escalator.

Because the bearing positioning is realized only by axial preload rather than radial interference fit, the dimensional tolerance of the bearing seat is not easy to affect the assembly accuracy, so it is conducive to the high-efficiency die-casting process to manufacture the steps of the escalator. This further improves production efficiency.

The foregoing description of the specific exemplary embodiments of the present disclosure is for the purpose of explanation and description. The foregoing description does not want to be exhaustive, nor to limit the present disclosure to the precise form disclosed. Obviously, many changes and variations are possible according to the above teaching. The purpose of selecting and describing exemplary embodiments is to explain the specific principles and practical applications of the present disclosure, so that other skilled persons in the art can realize and utilize various exemplary embodiments of the present disclosure and various selection forms and modification forms. The scope of the present disclosure is intended to be defined by the appended claims and their equivalent forms.

The invention claimed is:

1. A bearing positioning structure without radial interference fit, which is used for a step of an escalator, the bearing positioning structure comprising:

- a bearing seat formed on both sides of the step of the escalator;
- a rolling bearing, a bearing inner ring of which is matched with a circumferential surface of the bearing seat, such that a step roller is installed on the bearing seat through the rolling bearing; wherein:
- the bearing positioning structure also comprises a bolt, a washer and a nut, the bearing seat has a central through hole coaxial with its circumferential surface, the bolt successively passes through the washer, the bearing inner ring of the rolling bearing, the central through hole and the nut, and the inner ring of the rolling bearing is axially clamped between the washer and an axial limit step of the bearing seat without radial interference fit between rolling bearing and circumferential surface by tightening the nut.

2. The bearing positioning structure without radial interference fit according to claim 1, wherein the step of the escalator is a die-casting step which is made of castable metallic materials through a die-casting process.

3. The bearing positioning structure without radial interference fit according to claim 2, wherein an axial length of the circumferential surface of the bearing seat is adapted to an axial dimension of the rolling bearing and a geometric dimension of threaded connection, so as to avoid contact between the die-casting step and the washer that is deformed under the pretension force, and the threaded connection is composed of a combination of the bolt, the washer and the nut.

4. The bearing positioning structure without radial interference fit according to claim 2, wherein there is a transition fillet between the circumferential surface of the bearing seat and the axial limit step, and the radius of the transition fillet is less than the radius of a fillet between an inner hole of the inner ring the rolling bearing and an end face of the rolling bearing.

5. The bearing positioning structure without radial interference fit according to claim 2, wherein the circumferential surface of the bearing seat is a conical surface with small cone angle, and the conical surface gradually tilts outwardly from the transition fillet.

* * * * *